(12) United States Patent
Kitamura

(10) Patent No.: US 8,655,561 B2
(45) Date of Patent: Feb. 18, 2014

(54) BICYCLE CONTROL SYSTEM HAVING A VALUE GENERATING UNIT

(75) Inventor: Satoshi Kitamura, Nara (JP)

(73) Assignee: Shimano Inc., Osaka (JP)

( * ) Notice: Subject to any disclaimer, the term of this patent is extended or adjusted under 35 U.S.C. 154(b) by 336 days.

(21) Appl. No.: 12/821,505

(22) Filed: Jun. 23, 2010

(65) Prior Publication Data

US 2011/0320093 A1 Dec. 29, 2011

(51) Int. Cl.
*G06F 7/00* (2006.01)
(52) U.S. Cl.
USPC .............................................................. 701/51
(58) Field of Classification Search
None
See application file for complete search history.

(56) References Cited

U.S. PATENT DOCUMENTS

| | | | |
|---|---|---|---|
| 6,204,775 B1 | 3/2001 | Kubacsi | |
| 7,522,033 B2 | 4/2009 | Takamoto et al. | |
| 7,761,212 B2* | 7/2010 | Takebayashi | 701/51 |
| 2006/0038657 A1* | 2/2006 | Denison et al. | 340/5.73 |
| 2006/0208169 A1* | 9/2006 | Breed et al. | 250/221 |
| 2007/0164324 A1* | 7/2007 | Denison et al. | 257/277 |
| 2008/0133096 A1 | 6/2008 | Guderzo | |
| 2009/0070514 A1* | 3/2009 | Moriyama et al. | 710/311 |
| 2009/0102628 A1 | 4/2009 | Takebayashi | |
| 2009/0204299 A1* | 8/2009 | Miglioranza | 701/51 |
| 2011/0187496 A1* | 8/2011 | Denison et al. | 340/5.53 |

FOREIGN PATENT DOCUMENTS

| | | |
|---|---|---|
| EP | 1 500 582 A1 | 1/2005 |
| EP | 2 003 051 A2 | 12/2008 |
| EP | 2 072 091 A1 | 6/2009 |
| EP | 2 129 080 A1 | 12/2009 |

OTHER PUBLICATIONS

EP Serach Report of corresponding EP Application No. 11 15 9633.3 dated Oct. 14, 2011.

* cited by examiner

*Primary Examiner* — Thomas Tarcza
*Assistant Examiner* — Adam Alharbi
(74) *Attorney, Agent, or Firm* — Global IP Counselors

(57) ABSTRACT

A bicycle control system includes at least one user input member, a value generating unit, a wireless transmitter and a wireless receiver. The value generating unit includes a memory component that at least temporarily stores a generated value. The value generating unit updates the generated value that was memorized in accordance with the at least one user input member was operated. The wireless transmitter periodically transmits control signals that are indicative of the generated value. The wireless receiver receives the control signals from the wireless transmitter.

11 Claims, 8 Drawing Sheets

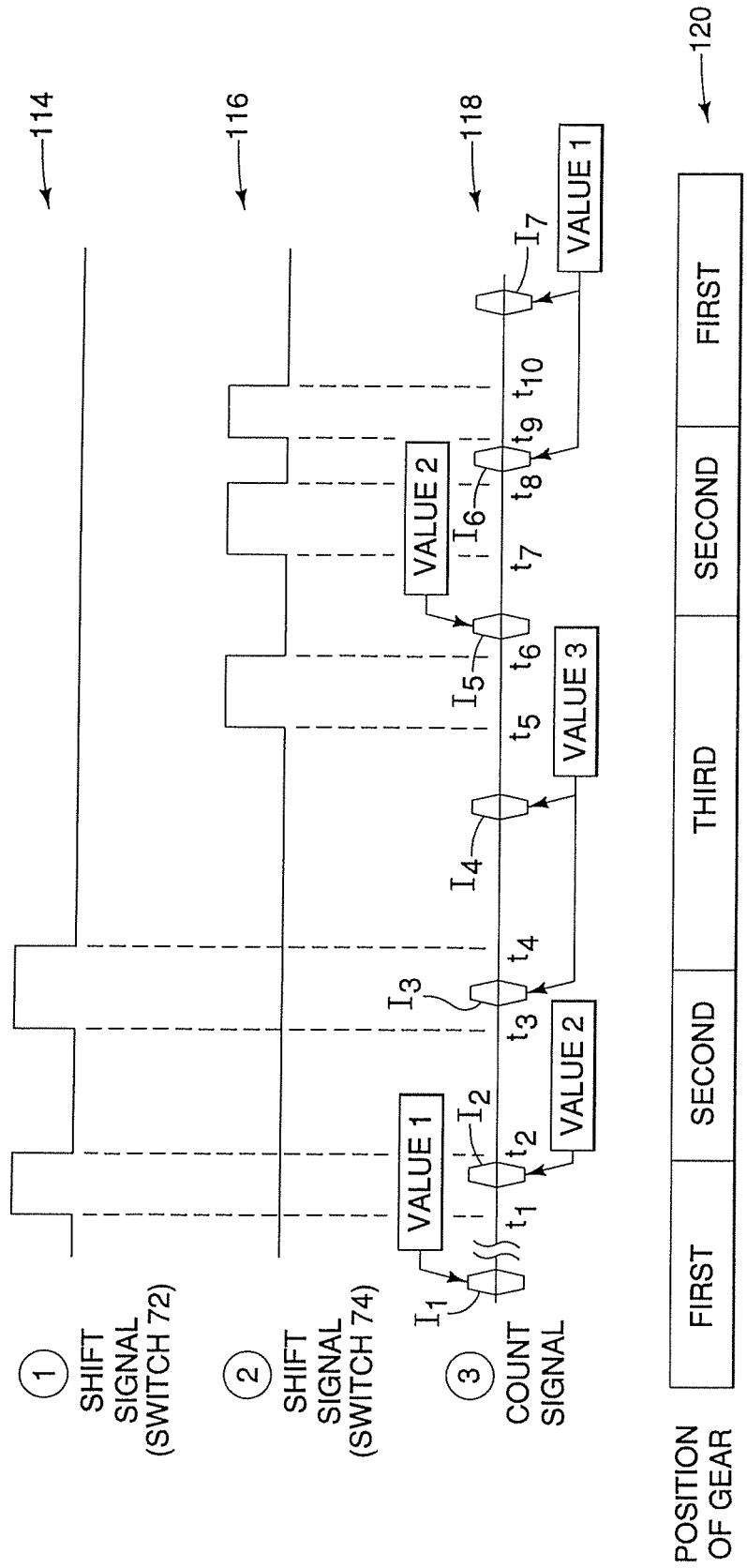

BICYCLE CONTROL SYSTEM HAVING A VALUE GENERATING UNIT

BACKGROUND

1. Field of the Invention

This invention generally relates to a bicycle control system. More specifically, the present invention relates to a bicycle control system that wirelessly transmits control signals to control components on the bicycle.

2. Background Information

Bicycle control systems exist that wirelessly control bicycle components, such as the bicycle derailleur systems. In an example of such a control system, an upshift signal (e.g., a high signal) is transmitted continuously during the time that an upshift switch is operated, and a downshift signal (e.g., a pulse signal) is transmitted continuously during the time that a downshift switch is operated. However, it can be appreciated that the amount of electric power needed to output a high signal or pulse signal continuously when the upshift switch or downshift switch is operated is much greater than the amount of electric power needed to output such signals intermittently.

Accordingly, a bicycle control system can perform synchronous communication with the components of the system control (e.g., the bicycle derailleur system) so that the upshift and downshift signals need not be transmitted continuously while the upshift and downshift switches are operated. In an example of such a control system, a transmitter unit is associated with each shift switch, and outputs a signal representing the state of the associated shift switch at prescribed periods of time, for example, every 100 milliseconds. For instance, the transmitter associated with the upshift switch transmits a high signal at the prescribed period of time when the upshift switch is being operated at the time of signal transmission. Also, the transmitter associated with the upshift switch transmits a low signal at the prescribed periods of time when the upshift switch is not being operated. Similar transmissions occur for a downshift switch. When a receiver unit associated with a derailleur system (e.g., the rear derailleur system) receives the high signals output by the transmitter units of the upshift switch or downshift switch, the receiver unit outputs a shift commission signal to control the rear derailleur system to perform an upshift or downshift operation as appropriate.

As can be appreciated, if the operating time of the upshift or downshift switch is shorter than the length of time between prescribed transmission periods (e.g., less than 100 milliseconds), operation of the upshift or downshift switch can occur between prescribed transmission periods. In this event, the transmitter transmits the signals at times when the shift switch is not being operated and thus, an indication of the shifting operation will not be transmitted. Furthermore, even if the transmitter correctly transmits the signal, noise or other disturbances may interfere with the signal and thus, the receiver may not receive the signal. If any of these situations occur, the receiver will not receive the correct shifting signal and thus, will not shift the gear position correctly.

Shortening the time between prescribed transmission periods can potentially reduce the possibility that operation of a shift switch will be brief enough to occur between prescribed transmission periods, thus increasing the likelihood that at least one transmission will occur during a shift switch operation. Also, shortening the time between prescribed transmission periods increases the number of transmissions, thus increasing the likelihood that the receiver will receive a transmission indicating operation of a shift switch even in the presence of noise or other interferences. However, increasing the number of transmissions increases the electric power consumption by the transmitter, thus decreasing the efficiency of the control system.

In view of the above, it will be apparent to those skilled in the art from this disclosure that there exists a need for an improved bicycle wireless control system. This invention addresses this need in the art as well as other needs, which will become apparent to those skilled in the art from this disclosure.

SUMMARY

One object of the present invention is to provide an improved bicycle wireless control system.

Another object of the present invention is to provide an improved bicycle wireless control system for controlling front and rear derailleur systems. The foregoing objects can basically be attained by providing a bicycle control system that mainly comprises at least one user input member, a value generating unit, a wireless transmitter and a wireless receiver. The value generating unit includes a memory component that at least temporarily stores a generated value. The value generating unit updates the generated value that was memorized in accordance with the at least one user input member was operated. The wireless transmitter periodically transmits control signals that are indicative of the generated value. The wireless receiver receives the control signals from the wireless transmitter.

These and other objects, features, aspects and advantages of the present invention will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure:

FIG. 10 is another timing diagram illustrating an exemplary relationship between the signals output by the operation of the rear shifter and rear derailleur.

DETAILED DESCRIPTION OF EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
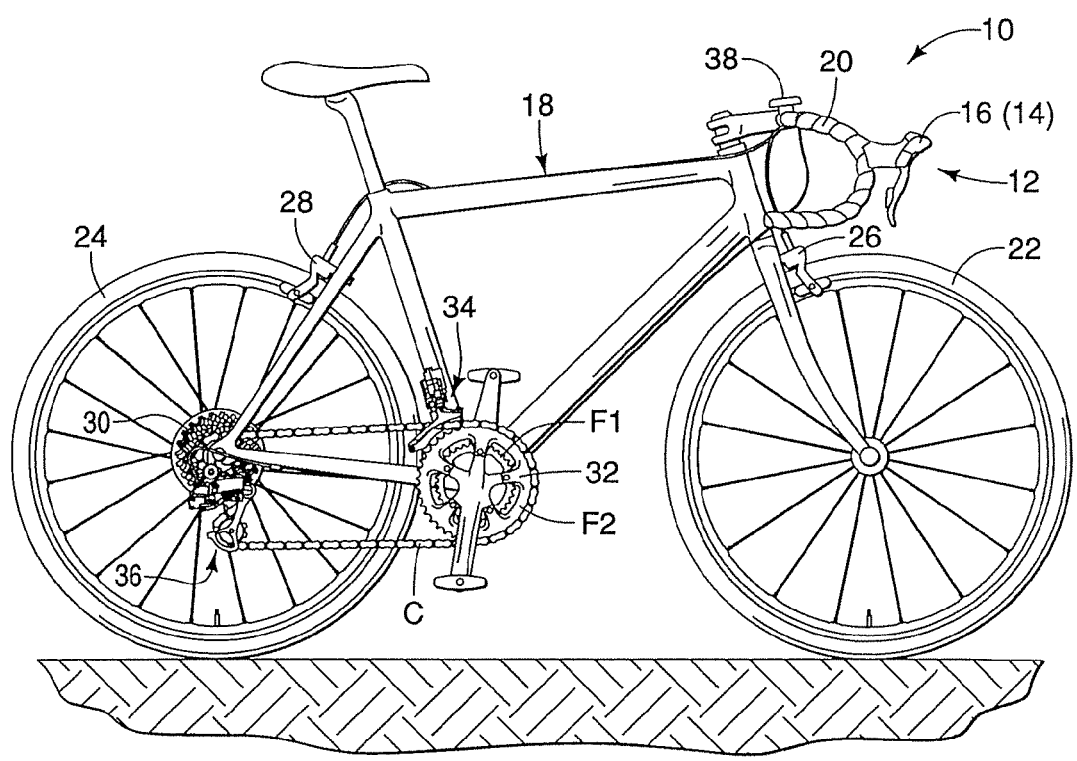
FIG. 1 is a side elevational view of a bicycle that includes a wireless bicycle control system mounted to the handlebar of the bicycle in accordance with a disclosed embodiment.
Figure 2:
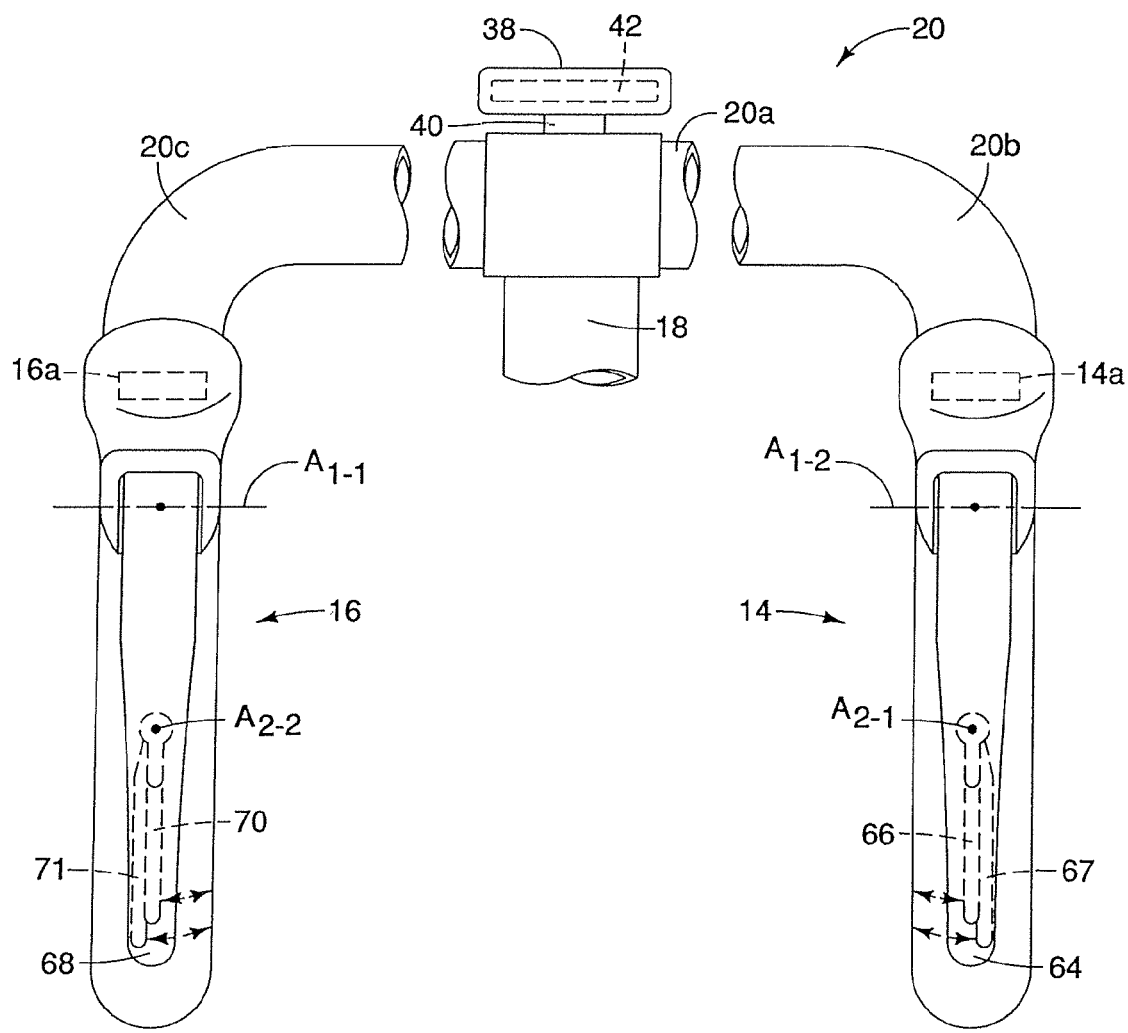
FIG. 2 is a front view of a portion of the bicycle illustrated in FIG. 1.
Figure 3:
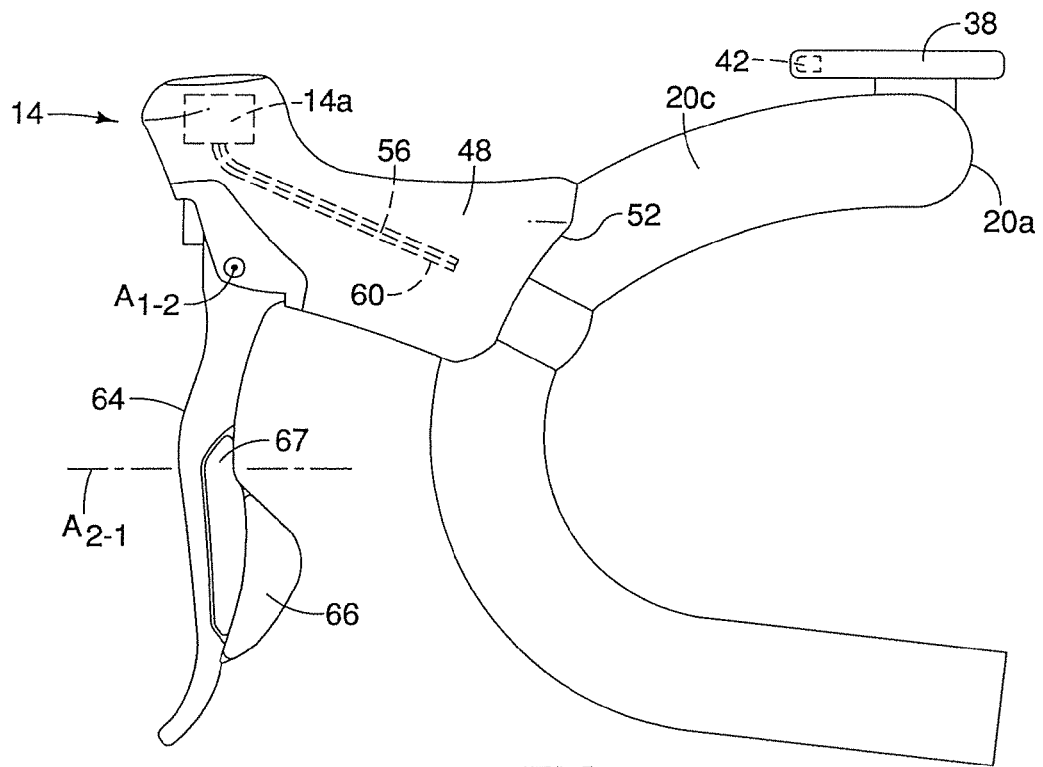
FIG. 3 is a side view of a portion of the handlebar showing an inboard side of the bicycle illustrated in FIG. 1.
Figure 4:
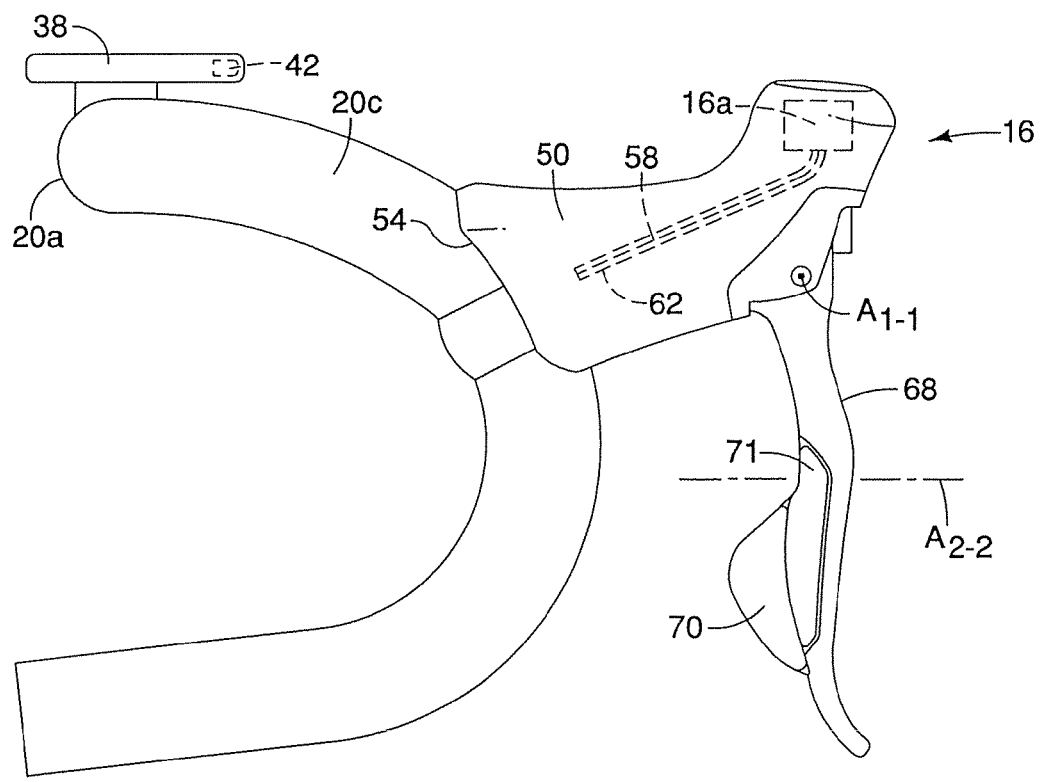
FIG. 4 is another side view of a portion of the handlebar showing another inboard side of the bicycle illustrated in FIG. 1.

Referring initially to FIG. 1, a bicycle 10 is illustrated in accordance with a disclosed embodiment. The bicycle 10 has an electrically powered wireless bicycle control system 12 that includes a front shifter 14 with a wireless controller 14a and a rear shifter 16 with a wireless controller 16a as shown in FIGS. 2-4 and described in greater detail below.

Figure 5:
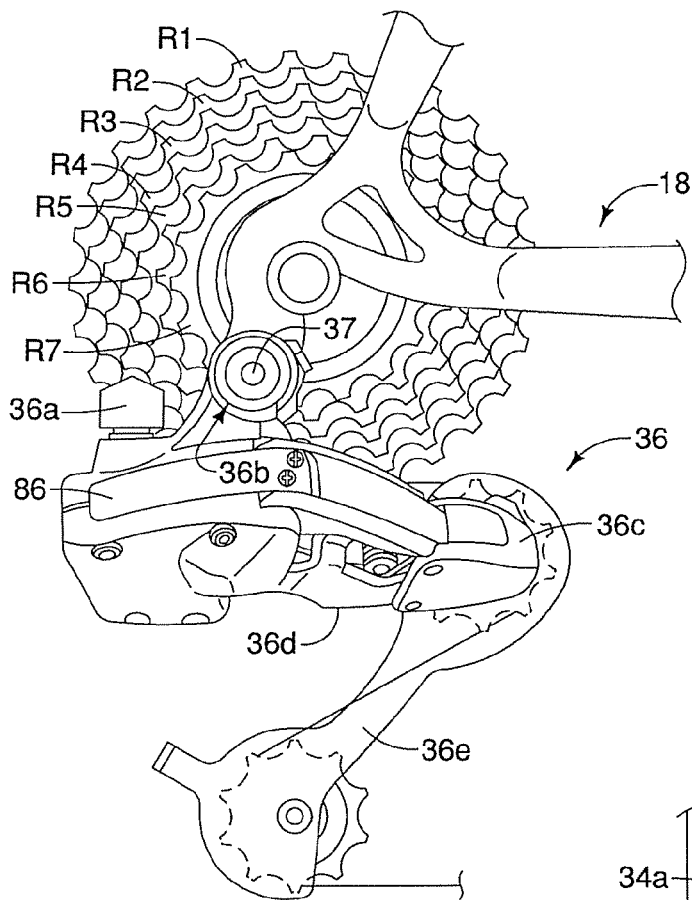
FIG. 5 is an enlarged side elevational view of the motorized rear derailleur of the bicycle illustrated in FIG. 1.

The bicycle 10 includes, among other things, a bicycle frame 18 with a handlebar 20, a front wheel 22, a rear wheel 24, a front brake 26 and a rear brake 28. As shown in FIGS. 2 to 4, the handlebar 20 includes a central portion 20a, a left portion 20b and a right portion 20c. Referring again to FIG. 1, the front wheel 22 is mounted in a conventional manner to a steering fork of the bicycle frame 18 below the handlebar 20. The rear wheel 24 includes a cassette 30 of chain sprockets R1 through R7, as shown in FIG. 5, and is mounted in a conventional manner to a rear portion of the bicycle frame 18. A chainring assembly 32, as shown in FIG. 1, is rotatably supported to a lower portion of the bicycle frame 18 in a conventional manner, and includes a set of chainrings F1 and F2 mounted to the crank axle in a conventional manner. A chain C is operatively coupled between the rear sprockets R1 to R7, and the chainrings F1 and F2, in a conventional manner.

The front brake 26 is mounted to the steering fork of the bicycle frame 18 adjacent to the front wheel 22 in a conventional manner. The rear brake 28 is mounted to the rear portion of the bicycle frame 18 adjacent to the rear wheel 24 in a conventional manner. Since the front wheel 22, the rear wheel 24, the front brake 26, the rear brake 28, the cassette 30 and the chainring assembly 32 are all conventional elements, no further description is provided for the sake of brevity.

The bicycle 10 also includes a front derailleur 34 and a rear derailleur 36 that are described in greater detail below. The front and rear derailleurs 34 and 36 includes wireless receivers 34a and 36a, respectively, which form part of the electrically powered wireless bicycle control system 12 as discussed below. The front derailleur 34 is attached to the bicycle frame 18 in a conventional manner adjacent to the chainring assembly 32. The front derailleur 34 is configured to move the chain C between the chainrings F1 and F2 of the chainring assembly 32 in a conventional manner as controlled by the front shifter 14 of the wireless bicycle control system 12. The rear derailleur 36 is attached to the bicycle frame 18 in a conventional manner adjacent to the cassette 30 and the rear wheel 24. The rear derailleur 36 is configured to move the chain C between the various diameter chain sprockets R1 through R7 of the cassette 30 in a conventional manner as controlled by the rear shifter 16 of the wireless bicycle control system 12.

In this depicted embodiment, the wireless bicycle control system 12 further includes a cycle computer or control unit 38 is mounted to the central portion 20a of the handlebar 20 in a conventional manner via a bicycle attachment portion 40. The control unit 38 includes a central processing unit (CPU) (not shown), conventional electronic memory, such as RAM, ROM and/or FLASH memory, a display (not shown), a battery (not shown) that powers the control unit 38. In the depicted embodiment, the control unit 38 includes a wireless signal receiver 42, which can receive information from the wireless controller 14a of the front shifter 14 and the wireless controller 16a of the rear shifter 16. Alternatively, the control unit 38 can be electrically coupled to wireless controllers 14a and 16a via wires or other suitable connections.

In the depicted embodiment, the shifters wireless controllers 14a and 16a are each configured to perform a braking function. In this example, the shifter 14 (i.e., left hand shift/brake control assembly) controls the front brake 26, and the shifter 16 (i.e., right hand shift/brake control assembly) controls the rear brake 28. Furthermore, the wireless controller 14a of the shifter 14 controls the front derailleur 34, and the wireless controller 16a of the shifter 16 controls the rear derailleur 36. However, the shifters 14 and 16 can instead be configured in an opposite manner in which case the shifter 14 controls the rear brake 28, and the shifter 16 controls the front brake 26. Likewise, the wireless controller 14a can be configured to control the rear derailleur 36, and the wireless controller 16a can be configured to control the front derailleur 34 as needed and/or desired.

As further shown in FIGS. 2-4, the shifters 14 and 16 include brackets 48 and 50, respectively, which are preferably made of a lightweight material such as composite materials, plastic, polymers or light weight metals such as aluminum or titanium. The brackets 48 and 50 include respective bicycle frame attachment portions 52 and 54 that attach the brackets 48 and 50 to the respective left and right portions 20b and 20c of the handlebar 20 in a conventional manner. Furthermore, the shifters 14 and 16 include respective channels 56 and 58 that can accommodate antennas 60 and 62 that are coupled to the wireless controllers 14a and 16a, respectively, if needed and/or desired.

The shifter 14 further includes a brake lever 64 and a shift lever 66, 67, while the shifter 16 further includes a brake lever 68 and a shift lever 70, 71. As understood in the art, the brake levers 64 and 68 pivot about axes $A_{1-1}$ and $A_{1-2}$, respectively, during a braking operation. On the other hands, the shift levers 66, 67 and 70, 71 pivot about axes $A_{2-1}$ and $A_{2-2}$, respectively, in a conventional manner during a shifting operation.

As shown in more detail in FIG. 5, the rear derailleur 36 is a motorized derailleur that is controlled electrically by the control unit 38. Motorized derailleurs such as the rear derailleur 36 are well known in the art, and thus, the rear derailleur 36 will only be briefly described and illustrated herein. Moreover, practically any electrically controlled rear derailleur can be used.

The rear derailleur 36, in this example, includes a mounting (fixed) member 36b, a movable member 36c, a four-point linkage (connecting) mechanism 36d and a chain guide 36e. As further shown, the mounting member 36b is fastened to the rear portion of the chain stay of the frame 18 in a conventional manner, such as by a bolt 37. The four-point linkage (connecting) mechanism 36d has two links with first ends of the links pivotally connected to the mounting member 36b and second ends pivotally connected to the movable member 36c. Thus, the four-point linkage mechanism 36d is arranged to movably connect the chain guide 36e to the mounting member 36b. The chain guide 36e has a chain cage with two pulleys for receiving the chain C. The chain cage of the chain guide 36e is also pivotally connected to the movable member 36c. The mounting member 36b includes an electric drive or motor unit 86 that is discussed in more detail below and operatively coupled to the four-point linkage (connecting) mechanism 36d for moving the movable member 36c laterally with respect to the frame 18. This lateral movement of the movable member 36c also moves the chain guide 36e laterally with respect to the frame 18 so that the chain C can be selectively shifted from one of the rear sprockets R1 to R7 to the next. That is, the chain guide 36e is configured to be moved to one of the rear sprockets R1 to R7 in response to a gear shifting operation of the wireless controller 16a so that the chain C is moved onto the corresponding sprocket of the rear sprockets R1 to R7.

Figure 6:
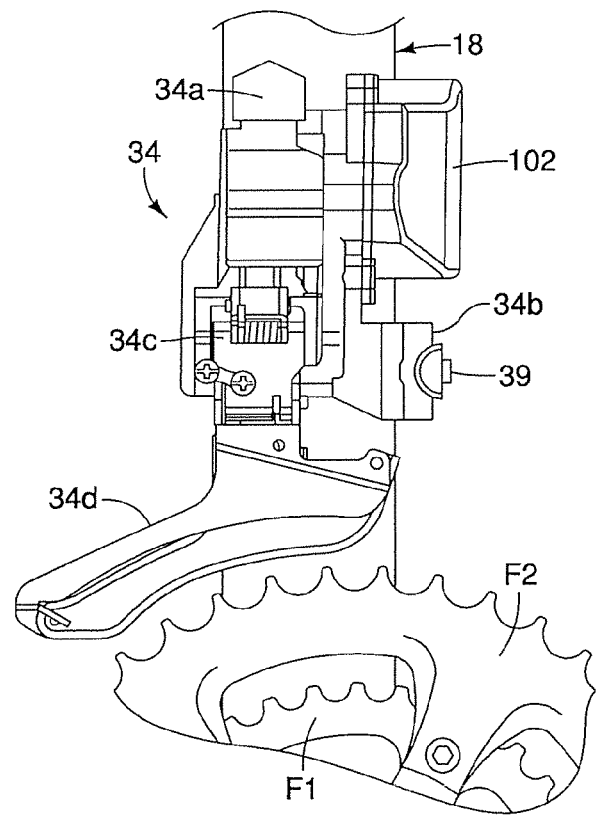
FIG. 6 is an enlarged side elevational view of the motorized front derailleur of the bicycle illustrated in FIG. 1.

As shown in FIG. 6, the front derailleur 34 is a motorized derailleur that is controlled electrically by the control unit 38. Motorized derailleurs such as the front derailleur 34 are well known in the art, and thus, the front derailleur 18 will only be briefly described and illustrated herein. Moreover, practically any electrically controlled front derailleur can be used. The front derailleur 34 in this example includes a mounting (fixed) member 34b, a four-point linkage (connecting) mechanism 34c and a chain guide 34d. The mounting member 34b is fastened to the seat tube of the frame 18 in a conventional manner by a bolt 39. The four-point linkage (connecting) mechanism 34c has two links with first ends of the links pivotally connected to the mounting member 34b and second ends pivotally connected to the chain guide 34d. Thus, the four-point linkage mechanism 34c is arranged to movably connect the chain guide 34d to the mounting member 34b. The chain guide 34d has a chain cage for receiving the chain C. The mounting member 34b includes an electric drive or motor unit 102 that is discussed in more detail below and operatively coupled to the four-point linkage (connecting) mechanism 34c for moving the chain guide 34d laterally with respect to the frame 18. This lateral movement of the chain guide 34d with respect to the frame 18 causes the chain C to be selectively shifted from one of the chainrings F1 to the next F2 and vice-versa.

Figure 7:
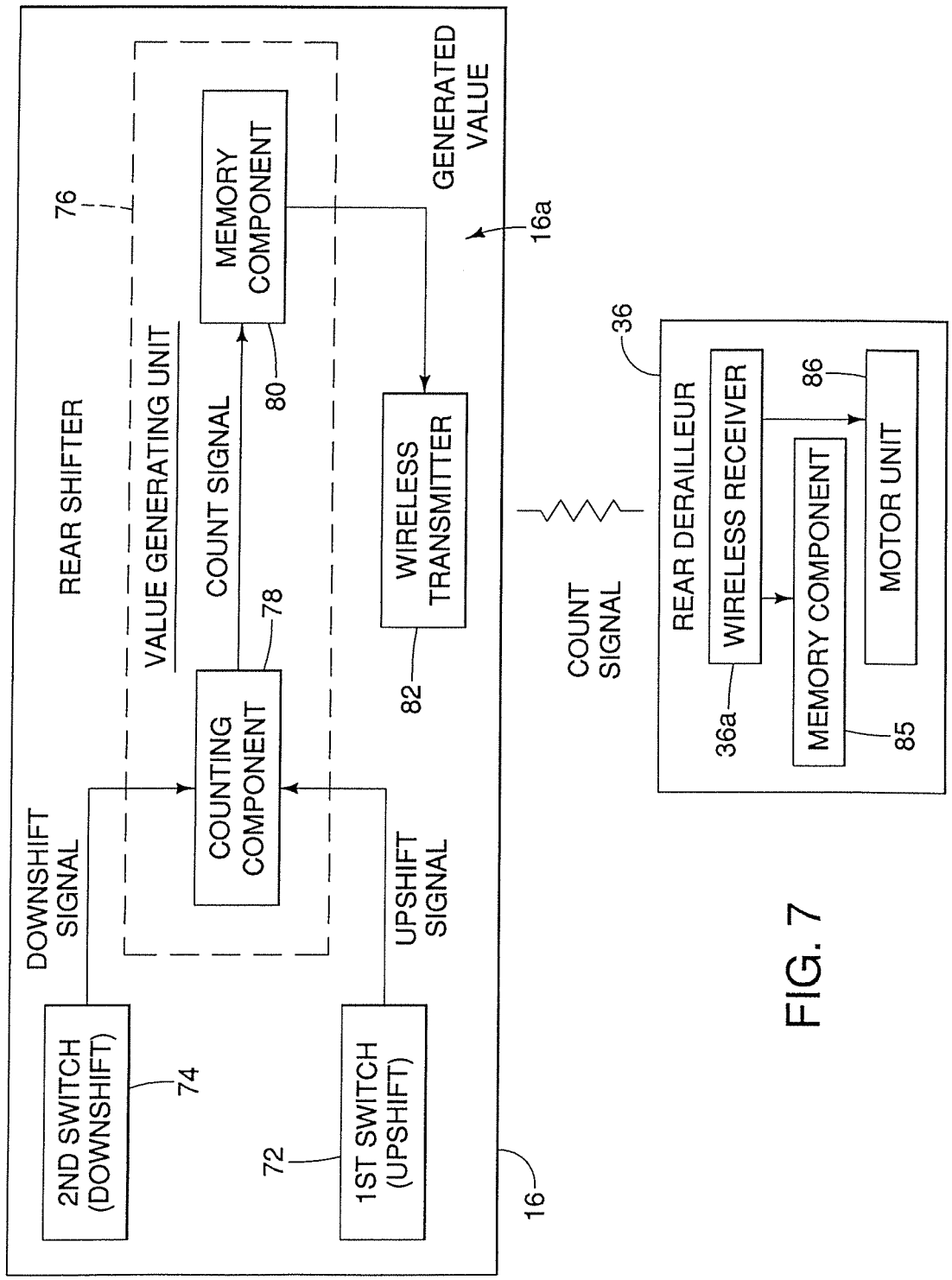
FIG. 7 is a block diagram of an example of the rear shifter and rear derailleur of the bicycle shown in FIG. 1.
Figure 8:
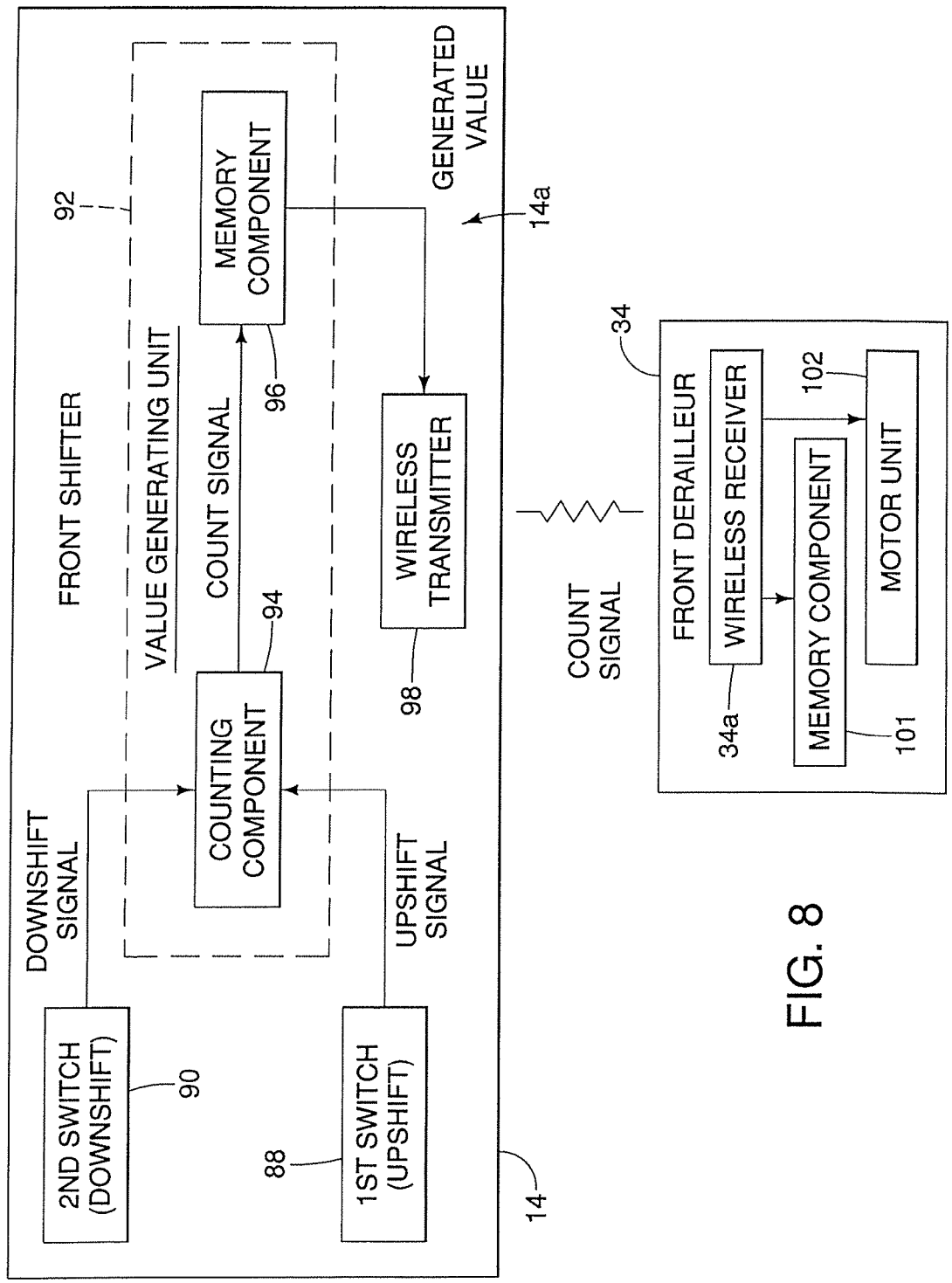
FIG. 8 is a block diagram of an example of the front shifter and front derailleur of the bicycle shown in FIG. 1.

Referring now to FIGS. 7 and 8, an example of components in the depicted wireless bicycle control system 12 configured to perform a shifting operation will now be described. As seen in FIG. 7, the portion of the wireless bicycle control system 12 that relates to the rear shifter 16 and the rear derailleur 36 is illustrated in a block diagram. As seen in FIG. 8, the portion of the wireless bicycle control system 12 that relates to the front shifter 14 and the front derailleur 34 is illustrated in a block diagram.

As shown in FIG. 7, the rear shifter 16 includes a first switch 72 and a second switch 74, which operate as user input members. In this example, the first switch 72 is operatively coupled to the shift lever 70 and the second switch 74 is operatively coupled to the shift lever 71 (FIGS. 2-4). The first and second switches 72 and 74 can include any type of toggle switch, pressure switch or any other suitable type of switch that provides an output signal in response to shifting movement of the shift lever 70 and 71 about axes $A_{2-2}$, respectively, to effect upshifting and downshifting.

As further shown in FIG. 7, the wireless controller 16a includes a value generating unit 76, which constitutes a value generating unit that generates a generated value (generated count) in accordance with operation of the shift lever 70 and/or 71. The value generating unit 76 includes a counting component 78 that counts each user operation of the first switch 72 and the second switch 74 to obtain the generated value. In the illustrated embodiment, the generated value corresponds to a user input count value or number that is selectively increased in response to a first user operation of one of the shift lever 70 and 71, and that is selectively decreased in response to a second user operation of the other one of the shift lever 70 and 71. Thus, in the illustrated embodiment, the generated value corresponds a gear position of the rear derailleur 36 based on a number of times the first switch 72 and/or the second switch 74 were operated by operation of the shift lever 70 and 71. In this configuration, the first switch 72 is configured as a first user input member that outputs an upshift signal. In response to each operation (upshift signal) of the first switch 72, the counting component 78 increases the generated count. Also, the second switch 74 is configured as second user input member that outputs a downshift signal. In response to each operation (downshift signal) of the second switch 74, the counting component 78 decreases the generated count.

The value generating unit 76 further includes a memory component 80, which can be any type of conventional non-volatile electronic memory, such as EPROM, EEPROM and/or FLASH memory. The counting component 78 outputs a control or count signal representative of the generated count, that is, the number of times that the first and second switches 72 and 74 have been operated as discussed in more detail below. The value generating unit 76 operates the counting component 78 to update the generated count each time the first switch 72 and/or the second switch 74 are operated by operation of the shift lever 70 and 71. In other words, the counting component 78 is configured to count each of the user operations of the first and second user input members (e.g., the shift lever 70 and 71), and the memory component 80 is configured to periodically update the generated count stored to reflect the update of the generated count.

Furthermore, the value generating unit 76 controls the counting component 78 to limit the generated count to a maximum of the generated count that corresponds to a pre-scribed number of gear positions. In this example, the cassette 30 includes seven gear positions corresponding to the seven chain sprockets R1 through R7. Accordingly, the counting component 78 limits the generated count to integer values between 1 and 7. Naturally, the integer values can be represented numerically, or in any other manner (e.g., alphanumerically, symbolically, etc.) representing a progression between seven different conditions. The memory component 80 thus stores the generated count represented by the count or control signal output by the counting component 78. Also, because the memory component 80 is nonvolatile, the memory component 80 retains the generated count when the value generating unit 76 is in an off state in which the value generating unit 76 does not count or, in other words, refrains from counting any user operation of the first and second switches 72 and 74. However, the wireless controller 16a can be configured with a reset button (not shown) to reset the values in the counting component 78 and memory component 80 to "1," for example.

The wireless controller 16a further includes a wireless transmitter 82. The wireless transmitter 82 reads or otherwise receives the generated count from the memory component 80, and outputs a wireless count or control signal indicative of the generated count. The wireless count or control signal can be a radio frequency (RF) signal or any other type of signal suitable for wireless communications as understood in the art. It should also be understood that the wireless transmitter 82 can transmit the signal at a particular frequency and/or with an identifier such as a particular code, to distinguish the wireless signal from other wireless signals, such as those transmitted by wireless controller 14a as discussed below.

As further shown in FIG. 7, in addition to the wireless receiver 36a, the rear derailleur 36 includes a memory component 85 and a motor unit 86. The wireless transmitter 82 is configured to periodically transmit the wireless count or control signal to the wireless receiver 36a with the wireless count or control signal being updated to reflect the update of the generated count as made by the counting component 78. For example, the wireless transmitter 82 periodically transmits the count or control signal to the wireless receiver 36a so that the count or control signal is periodically updated to reflect the update of the generated count. However, the wireless transmitter 82 transmits the count or control signal periodically regardless of whether the generated value has been updated or not.

The wireless receiver 36a receives the count or control signal from the wireless transmitter 82, and can recognize the count or control signal based on the particular frequency of the count or control signal and/or an identifier included in the count or control signal as discussed above. The wireless receiver 36a stores the received generated value contained in the count or control signal in memory component 85. Furthermore, the wireless receiver 36a is electrically connected to a bicycle component which, in this example, is the motor unit 86. The motor unit 86 controls the rear derailleur 36 to change between at least two different operating states in response to the count or control signal received by the wireless receiver as discussed in more detail below. Hence, in this example, the bicycle component is a gear speed changing device, with the gear speed changing device and the value generating unit 76 being synchronized such that the generated count corresponds to a current gear position as discussed in more detail below.

As shown in FIG. 8, the wireless controller 14a controls the front derailleur 34. The wireless controller 14a has components similar to those described above in wireless controller 16a. The wireless controller 14a includes a first switch 88 and a second switch 90, which operate as user input members. In this example, the first switch 88 is operatively coupled to the shift lever 66 and the second switch 90 is operatively coupled to the shift lever 67 (FIGS. 2-4). The first and second switches 88 and 90 can include any type of toggle switch, pressure switch or any other suitable type of switch that provides an output signal in response to shifting movement of the shift lever 66 and 67 about axes $A_{2-1}$, respectively, to effect upshifting and downshifting.

As further shown in FIG. 8, the wireless controller 14a includes an value generating unit 92, which constitutes a value generating unit that generates a generated value (generated count) in accordance with operation of the shift lever 66 and/or 67. The value generating unit 92 can be similar to value generating unit 76. The value generating unit 92 includes a counting component 94 that counts each user operation of the first switch 88 and the second switch 90 to obtain the generated count value. In the illustrated embodiment, the generated value corresponds to a user input count value or number that is selectively increased in response to a first user operation of one of the shift lever 66 and 67, and that is selectively decreased in response to a second user operation of the other one of the shift lever 66 and 67. Thus, in the illustrated embodiment, the generated value corresponds a gear position of the front derailleur 34 based on a number of times the first switch 88 and/or the second switch 90 were operated by operation of the shift lever 66 and 67. In this configuration, the first switch 88 is configured as a first user input member that outputs an upshift signal. In response to each operation (upshift signal) of the first switch 88, the counting component 94 increases the generated count. Also, the second switch 90 is configured as second user input member that outputs a downshift signal. In response to each operation (downshift signal) of the second switch 90, the counting component 94 decreases the generated count.

The value generating unit 92 further includes a memory component 96, which can be any type of conventional nonvolatile electronic memory, such as EPROM, EEPROM and/or FLASH memory. The counting component 94 outputs a control or count signal representative of the generated count, that is, the number of times that the first and second switches 88 and 90 have been operated as discussed in more detail below. The value generating unit 92 operates the counting component 94 to update the count number or generated value each time the first switch 88 and/or the second switch 90 are operated by operation of the shift lever 66 and 67. In other words, the counting component 94 is configured to count or generated value each of the user operations of the first and second user input members, and the memory component 96 is configured to update the user input count number stored to reflect the update of the total user input count number.

Furthermore, the value generating unit 92 controls the counting component 94 to limit the generated count to a maximum number that corresponds to a prescribed number of gear positions. In this example, chainring assembly 32 includes a set of two chainrings F1 and F2. Accordingly, the counting component 94 limits the generated count to integer values 1 and 2. Naturally, the integer values can be represented numerically, or in any other manner (e.g., alphanumerically, symbolically, etc.) representing a progression between two different conditions. The memory component 96 thus memorizes or stores the generated count represented by the count or control signal output by the counting component 94. Also, because the memory component 96 is nonvolatile, the memory component 96 retains the generated count when the value generating unit 92 is in an off state in which the value generating unit 92 does not count or, in other words, refrains from counting any user operation of the first and second switches 88 and 90. However, the wireless controller 14a can be configured with a reset button (not shown) to reset the values in the counting component 94 and memory component 96 to "1," for example.

The wireless controller 14a further includes a wireless transmitter 98. In a manner similar to the wireless transmitter 82, the wireless transmitter 98 reads or otherwise receives the generated count from the memory component 96, and outputs a wireless count or control signal indicative of the generated count. The wireless count or control signal can be a radio frequency (RF) signal or any other type of signal suitable for wireless communications as understood in the art. It should also be understood that the wireless transmitter 98 can transmit the signal at a particular frequency and/or with an identifier such as a particular code, to distinguish the wireless signal from other wireless signals, such as those transmitted by wireless controller 16a as discussed above.

As further shown in FIG. 8, in addition to the wireless receiver 34a the front derailleur 34 includes a memory component 101 and a motor unit 102. The wireless transmitter 98 is configured to periodically transmit the wireless count or control signal to the wireless receiver 34a with the wireless count or control signal being updated to reflect the update of the generated count as made by the counting component 94. For example, the wireless transmitter 98 is configured to periodically transmit the count or control signal to the wireless receiver 34a so that the count or control signal is updated to reflect the update of the generated count. However, the wireless transmitter 98 transmits the count or control signal periodically regardless of whether the generated value has been updated or not.

The wireless receiver 34a receives the count or control signal from the wireless transmitter 98, and can recognize the count or control signal based on the particular frequency of the count or control signal and/or an identifier included in the count or control signal as discussed above. The wireless receiver 34a stores the received generated value contained in the count or control signal in the memory component 101. The wireless receiver 34a also is electrically connected to a bicycle component which, in this example, is the motor unit 102. The motor unit 102 controls the front derailleur 34 to change between at least two different operating states in response to the count or control signal received by the wireless receiver as discussed in more detail below. Hence, in this example, the bicycle component is a gear speed changing device, with the gear speed changing device and the value generating unit 92 being synchronized such that the generated count corresponds to a current gear position as discussed in more detail below.

Figure 9:
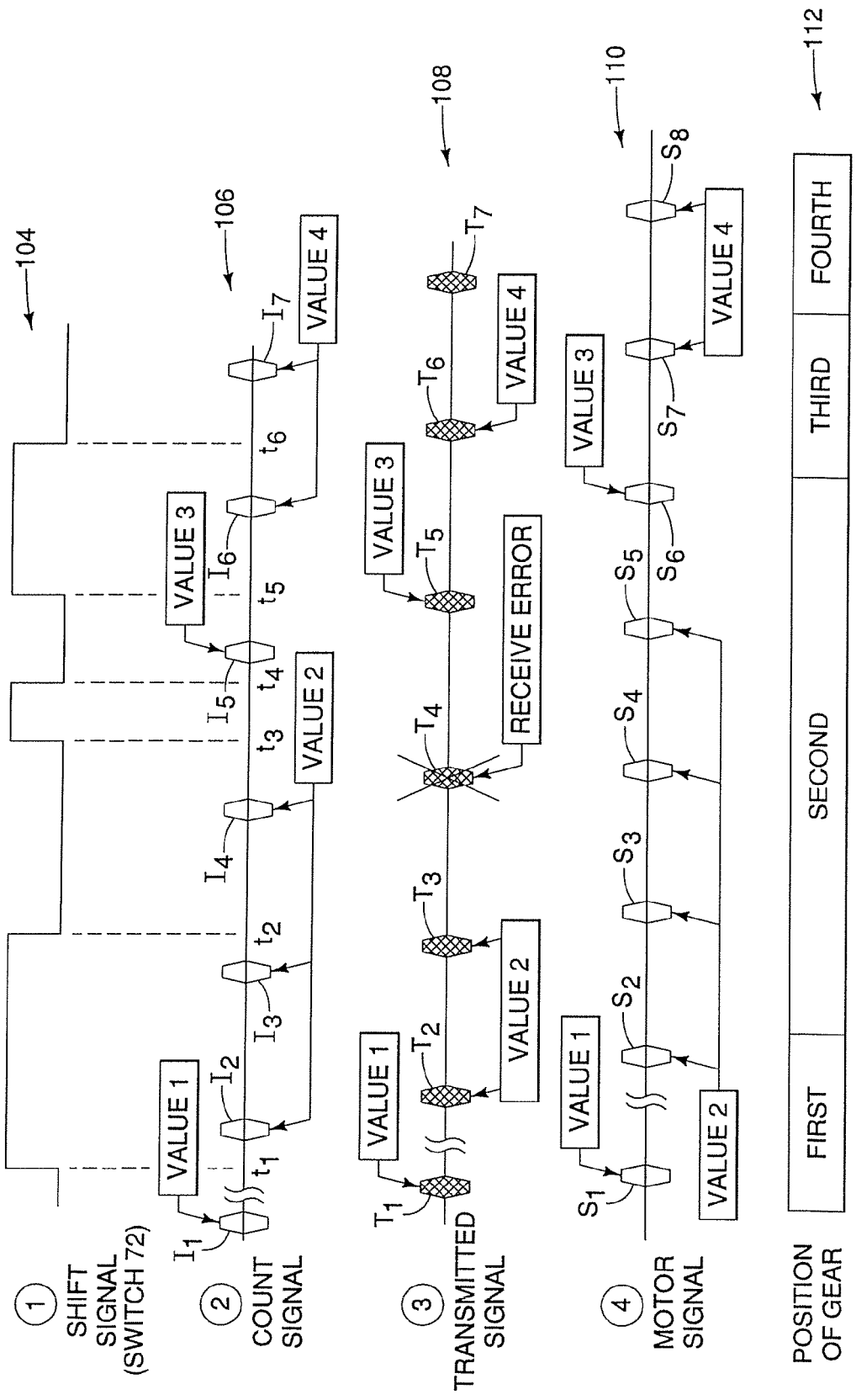
FIG. 9 is a timing diagram illustrating an exemplary relationship between the signals output by the operation of the rear shifter and the rear derailleur.

Further details of an example of the operation of the wireless controllers 14a and 16a and their respective derailleurs 34 and 36 will now be described with regard to the timing diagram of FIG. 9. For purposes of discussion, FIG. 9 represents an exemplary operation that occurs between the wireless controller 16a and the rear derailleur 36. However, the same type of operation occurs between the wireless controller 14a and the front derailleur 34.

Graph 104 indicates an example of the condition of the upshift signal that is output by the first switch 72 of the wireless controller 16a shown in FIG. 7. In this example, it is assumed that the rear derailleur 36 is in a position so that the chain C is on sprocket R1 (i.e., the "1" position). As indicated, the shift lever 70 (FIGS. 2-4) is operated for time periods $t_1$ through $t_2$, $t_3$ through $t_4$, and $t_5$ through $t_6$. In response, the first switch 72 outputs the upshift signal at a high (e.g., binary "1") level during the time periods $t_1$ through $t_2$, $t_3$ through $t_4$, and $t_5$ through $t_6$.

Accordingly, prior to the operation of the first switch at time $t_1$, the generated value counted by the counting component is "1." As discussed above, the counting component 78 updates the memory component 80 with the updated input count number each time the shift lever 70 is operated. As indicated in graph 106, the value generating unit 76 sends the currently stored count number (generated value) to the wireless transmitter 82 at each of the time intervals $I_1$ through $I_7$. Accordingly, the wireless transmitter 82 effectively receives the most recently stored count number (generated value) at each of the time intervals $I_1$ through $I_7$. Hence, the memory component 80 has a count number of "1" (generated value) at the time interval $I_1$, a count number of "2" (generated value) at the time intervals $I_2$, $I_3$ and $I_4$, a count number of "3" (generated value) at the time interval $I_5$, and a count number of "4" (generated value) at the time intervals $I_6$ and $I_7$.

As shown in graph 108, the wireless transmitter 82 transmits the count or control signal at prescribed transmission intervals $T_1$ through $T_7$, which in this example occur every 100 msec, for receipt by the wireless receiver 36a as discussed above. Accordingly, at the transmission interval $T_1$, the count or control signal includes data representing the generated value "1." Upon receiving the count or control signal, the wireless receiver 36a updates the memory component 85 with the new generated value, which in this case is "1."

Graph 110 indicates an example of the communication of shift signals that occurs between the wireless receiver 36a and the motor unit 86 at the time intervals $S_1$ through $S_7$, which in this example occur at least every 100 msec. That is, at everyone of the time interval $S_1$ through $S_7$, the wireless receiver 36a controls the motor unit 86, if needed, to position the rear derailleur 34 to a shift position represented by the generated value included in the received count or control signal, which is stored in the memory component 85. At the time interval $S_1$, because the generated value received by wireless receiver 36a is "1," the wireless receiver 36a controls the motor unit 86 to position the rear derailleur 34 at shift position 1. In this case, the rear derailleur 34 is already at shift position 1, in which the chain C is on sprocket R1, and thus does not need to move. Accordingly, as indicated in graph 112, the rear derailleur 34 remains at shift position 1.

Returning now to graph 104, in response to the first operation of the first switch 72 during the time period $t_1$ through $t_2$, the counting component 78 of the value generating unit 76 updates the generated count from the starting generated value "1" to the updated generated value "2". The memory component 80 is thus updated to store the generated value "2." As indicated in graph 106, the value generating unit 76 sends the currently stored count number (generated value "2") to the wireless transmitter 82 at the prescribed time interval $I_2$.

As shown in graph 108, the wireless transmitter 82 transmits the count or control signal at the prescribed transmission intervals as discussed above. Accordingly, at the transmission interval $T_2$, the count or control signal includes data representing the generated value "2." The wireless receiver 36a receives the transmitted count or control signal, and updates the memory component 85 with the generated value, which in this case is "2." Then, as indicated in graph 110, the wireless receiver 36a controls the motor unit 86 at the time interval $S_2$ to position the rear derailleur 34 at shift position 2. In this event, the rear derailleur 34 moves the chain C onto sprocket R2, as indicated in graph 112.

Returning now to graph 106, the value generating unit 76 sends the currently stored count number (generated value "2") to the wireless transmitter 82 at the prescribed time interval $I_3$. In other words, the value of the memory component 80 did not change because the value of the counting component 78 did not change, and thus, the value to be transmitted by the wireless transmitter 82 does not change. As shown in graph 108, the wireless transmitter 82 transmits the count or control signal including data representing the generated value "2" at the transmission interval $T_3$. The wireless receiver 36a receives the transmitted count or control signal, and updates the memory component 85 with the generated value, which in this case remains at "2." Then, as indicated in graph 110, the wireless receiver 36a controls the motor unit 86 at the time interval $S_3$ to position the rear derailleur 34 at shift position 2. In this event, the rear derailleur 34 does not need to move, as indicated in graph 112.

As shown in graph 104, the user stops operating the shift lever 70 (FIGS. 2-4) at time $t_2$. In response, the first switch 72 outputs the upshift signal at a low (e.g., binary "0") level. As indicated in graph 106, the value generating unit 76 sends the currently stored count number (generated value "2") to the wireless transmitter 82 at the prescribed time interval $I_4$. In other words, the value of the memory component 80 did not change because the value of the counting component 78 did not change, and thus, the value to be transmitted by the wireless transmitter 82 does not change.

As shown in graph 108, the wireless transmitter 82 transmits the count or control signal including data representing the generated value "2" at the transmission interval $T_4$. However, due to interference or some other problem, the count or control signal is not properly received by the wireless receiver 36a. Accordingly, the memory component 85 retains the data representing the generated value "2." Then, as indicated in graph 110, the wireless receiver 36a controls the motor unit 86 at the time interval $S_4$ to position the rear derailleur 34 at shift position 2. In this event, the rear derailleur 34 does not need to move, as indicated in graph 112.

As further shown in graph 104, the user again operates the shift lever 70 at time $t_3$ for a brief period extending to time $t_4$. In response, the first switch 72 outputs the upshift signal at a high (e.g., binary "1") level. The counting component 78 updates the memory component 80 with the generated value "3." The value generating unit 76 sends the currently stored count number (generated value "3") to the wireless transmitter 82 at the prescribed time interval $I_5$. Hence, even though the prescribed time interval $I_5$ did not occur when the first switch 72 was actually being operated, the counting component 78 updated the memory component 80 in response to the operation of the first switch 72. Thus, the memory component 80 stores the correct count value of "3," and that value is passed to the wireless transmitter 82 at time interval $I_5$.

As shown in graph 108, the wireless transmitter 82 transmits the count or control signal including data representing the generated value "3" at the transmission interval $T_5$. It should be noted, however, that as shown in graph 110, the time periods between intervals at which the receiver 36a controls the motor unit 86 can be shorter than the time periods between the transmission intervals $T_1$ through $T_7$ and the time periods between updating intervals $I_1$ through $I_7$. Accordingly, the wireless receiver 36a can on occasion control the motor unit 86 at a time interval before another transmission has been received. For example, times intervals $S_4$ and $S_5$ occur after the transmission interval $T_4$ but prior to the transmission interval $T_5$. Nevertheless, since the correct generated value (i.e., "2") is stored in the memory 85, the wireless receiver 36a controls the motor unit 86 at the time interval $S_5$ to position the rear derailleur 34 at shift position 2. In this event, the rear derailleur 34 does not need to move, as indicated in graph 112.

However, once the transmission occurs at the transmission interval $T_5$, the wireless receiver 36a receives the count or control signal and updates the memory component 85 at the prescribed time interval with the generated value "3." Then, as indicated in graph 110, the wireless receiver 36a controls the motor unit 86 at the time interval $S_6$ to position the rear derailleur 34 at shift position 3. Accordingly, the rear derailleur 34 moves the chain C onto sprocket R3, as indicated in graph 112.

As shown in graph 104, the user again operates the shift lever 70 at time $t_5$ for a period extending to time $t_6$. In response, the first switch 72 outputs the upshift signal at a high (e.g., binary "1") level. The counting component 78 updates the memory component 80 with the generated value "4." The value generating unit 76 sends the currently stored count number (generated value "4") to the wireless transmitter 82 at the prescribed time interval $I_6$.

As shown in graph 108, the wireless transmitter 82 transmits the count or control signal including data representing the generated value "4" at the transmission interval $T_6$. The wireless receiver 36a receives the count or control signal and updates the memory component 85 at the prescribed time interval with the generated value "4." Then, as indicated in graph 110, the wireless receiver 36a controls the motor unit 86 at the time interval $S_7$ to position the rear derailleur 34 at shift position 4. Accordingly, the rear derailleur 34 moves the chain C onto sprocket R4, as indicated in graph 112.

As shown in graph 104, the shift lever 70 is not operated after time $t_6$. Thus, the value in the memory component 80 remains at "4." Nevertheless, as indicated in graph 106, the value generating unit 76 sends the currently stored count number (generated value "4") to the wireless transmitter 82 at the prescribed time interval $I_7$.

As shown in graph 108, the wireless transmitter 82 transmits the count or control signal including data representing the generated value "4" at the transmission interval $T_7$. The wireless receiver 36a receives the count or control signal and updates the memory component 85 at the prescribed time interval with the generated value "4." Then, as indicated in graph 110, the wireless receiver 36a controls the motor unit 86 at the time interval $S_8$ to position the rear derailleur 36 at shift position 4. Accordingly, since the rear derailleur 36 is already in the correct position, the rear derailleur 36 need not move, as indicated in graph 112.

FIG. 10 illustrates an example similar to that shown in FIG. 9, but further illustrates downshifting operations. In particular, graph 114 indicates an example of the condition of the upshift signal that is output by the first switch 72 of the wireless controller 16a shown in FIG. 7, and graph 116 indicates an example of the condition of the downshift signal that is output by the second switch 74 of the wireless controller 16a shown in FIG. 7. In this example, it is assumed that the rear derailleur 36 is in a position so that the chain C is initially on sprocket R1 (i.e., the "1" or first shift position). As indicated, the shift lever 70 (FIGS. 2-4) is operated for time periods $t_1$ through $t_2$ and $t_3$ through $t_4$, and the dual shift/brake lever 68 is operated for time periods $t_5$ through $t_6$, $t_7$ through $t_8$ and $t_9$ through $t_{10}$. In response, the first switch 72 outputs the upshift signal at a high (e.g., binary "1") level during the time periods $t_1$ through $t_2$, and $t_3$ through $t_4$, and the second switch 74 outputs the downshift signal at a high (e.g., binary "1") level during time periods $t_5$ through $t_6$, $t_7$ through $t_8$ and $t_9$ through $t_{10}$.

As with the operations shown in FIG. 9, prior to the operation of the first switch at time $t_1$, the generated value counted by the counting component is "1." As discussed above, the counting component 78 updates the memory component 80 with the updated input count number each time the shift lever 70 is operated. Thus, the counting component 78 updates the memory component 80 in response to the operation of the first switch at time $t_1$. As indicated in graph 118, the value generating unit 76 sends the currently stored count number (generated value "1") to the wireless transmitter 82 at time interval $I_1$. For simplicity, graphs showing the transmission by wireless transmitter 82 and the communication of shift signals that occurs between the wireless receiver 36a and the motor unit 86 have been omitted. However, their operations are consistent with those shown in FIG. 9. Hence, as indicated in graph 120, the rear derailleur 34 remains at the first shift position prior to time $t_1$.

Returning now to graph 114, in response to the first operation of the first switch 72 during the time period $t_1$ through $t_2$, the counting component 78 of the value generating unit 76 updates the generated count from the starting generated value "1" to the updated generated value "2." The memory component 80 is thus updated to store the generated value "2." As indicated in graph 118, the value generating unit 76 sends the currently stored count number (generated value "2") to the wireless transmitter 82 at the prescribed time interval $I_2$. As discussed with regard to FIG. 9, the wireless transmitter 82 transmits the count or control signal at the prescribed transmission intervals. Accordingly, the count or control signal includes data representing the generated value "2." The wireless receiver 36a receives the transmitted count or control signal, and updates the memory component 85 with the generated value, which in this case is "2." Then, the wireless receiver 36a controls the motor unit 86 to position the rear derailleur 34 at shift position 2. In this event, the rear derailleur 34 moves the chain C onto sprocket R2 (upshifts to the second shift position), as indicated in graph 120.

Returning now to graph 114, in response to the second operation of the first switch 72 during the time period $t_3$ through $t_4$, the counting component 78 of the value generating unit 76 updates the generated count from the starting generated value "2" to the updated generated value "3." The memory component 80 is thus updated to store the generated value "3." As indicated in graph 118, the value generating unit 76 sends the currently stored count number (generated value "3") to the wireless transmitter 82 at the prescribed time interval $I_3$. As discussed with regard to FIG. 9, the wireless transmitter 82 transmits the count or control signal at the prescribed transmission intervals. Accordingly, the count or control signal includes data representing the generated value "3." The wireless receiver 36a receives the transmitted count or control signal, and updates the memory component 85 with the generated value, which in this case is "3." Then, the wireless receiver 36a controls the motor unit 86 to position the rear derailleur 34 at shift position 3. In this event, the rear derailleur 34 moves the chain C onto sprocket R3 (upshifts to the third shift position), as indicated in graph 120.

Returning now to graph 118, the value generating unit 76 sends the currently stored count number (generated value "3") to the wireless transmitter 82 at the prescribed time interval $I_4$. In other words, the value of the memory component 80 did not change because the switches 72 or 74 were not operated, and the value of the counting component 78 did not change. Thus, the value to be transmitted by the wireless transmitter 82 does not change. The wireless transmitter 82 transmits the count or control signal including data representing the generated value "3." The wireless receiver 36a receives the transmitted count or control signal, and updates the memory component 85 with the generated value, which in this case remains at "3." Then, the wireless receiver 36a controls the motor unit 86 to position the rear derailleur 34 at shift position 3. In this event, the rear derailleur 34 does not need to move, as indicated in graph 120.

As shown in graph 114, the user stops operating the shift lever 70 (FIGS. 2-4) at time $t_4$. However, during period time period $t_5$ through $t_6$, the shift lever 71 is operated as shown in graph 116, which thus operates the second switch 74 during the time period $t_5$ through $t_6$. In response to the first operation of the second switch 74 during the time period $t_5$ through $t_6$, the counting component 78 of the value generating unit 76 updates the generated count from the generated value "3" to the updated generated value "2" to represent a downshifting operation. The memory component 80 is thus updated to store the generated value "2." As indicated in graph 118, the value generating unit 76 sends the currently stored count number (generated value "2") to the wireless transmitter 82 at the prescribed time interval $I_5$. As discussed with regard to FIG. 9, the wireless transmitter 82 transmits the count or control signal at the prescribed transmission intervals. Accordingly, the wireless receiver 36a receives the transmitted count or control signal, and updates the memory component 85 with the generated value, which in this case is "2." Then, the wireless receiver 36a controls the motor unit 86 to position the rear derailleur 34 at shift position 2. In this event, the rear derailleur 34 moves the chain C from sprocket R3 onto sprocket R2 (downshifts to the second shift position), as indicated in graph 120.

As further shown in graph 116, during period time period $t_7$ through $t_8$, the shift lever 71 is operated, which thus operates the second switch 74 during the time period $t_7$ through $t_8$. In response, the counting component 78 of the value generating unit 76 updates the generated count from the generated value "2" to the updated generated value "1" to represent a downshifting operation. The memory component 80 is thus updated to store the generated value "1." As indicated in graph 118, the value generating unit 76 sends the currently stored count number (generated value "1") to the wireless transmitter 82 at the prescribed time interval $I_6$. As discussed with regard to FIG. 9, the wireless transmitter 82 transmits the count or control signal at the prescribed transmission intervals. Accordingly, the wireless receiver 36a receives the transmitted count or control signal, and updates the memory component 85 with the generated value, which in this case is "1." Then, the wireless receiver 36a controls the motor unit 86 to position the rear derailleur 34 at shift position 1. In this event, the rear derailleur 34 moves the chain C from sprocket R2 onto sprocket R1 (downshifts to the first shift position), as indicated in graph 120.

In addition, during period time period $t_9$ through $t_{10}$ as shown in graph 114, the shift lever 71 is operated, which thus operates the second switch 74 during the time period $t_9$ through $t_{10}$. However, because the lowest value of the generated count is limited to "1" as discussed above, the counting component 78 of the value generating unit 76 maintains the generated count at "1." The memory component 80 is updated to store the generated value "1," and thus, does not change. As indicated in graph 118, the value generating unit 76 sends the currently stored count number (generated value "1") to the wireless transmitter 82 at the prescribed time interval $I_7$. As discussed with regard to FIG. 9, the wireless transmitter 82 transmits the count or control signal at the prescribed transmission intervals. Accordingly, the wireless receiver 36a receives the transmitted count or control signal, and updates the memory component 85 with the generated value, which in this case is "1." Then, the wireless receiver 36a controls the motor unit 86 to position the rear derailleur 34 at shift position 1. In this event, the rear derailleur 34 does not need to move the chain C, and the chain C remains on sprocket R1 (the first shift position), as indicated in graph 120.

The above processes shown in FIGS. 9 and 10 repeat for upshifting and downshifting of the rear derailleur 36 as performed by the shift lever 70 and 71 which control upshifting and downshifting, respectively, of the rear derailleur 36 as discussed above. It should also be noted that as discussed above, the range of the generated count is limited to the number of sprockets R1 through R7. Hence, even if the shift lever 71 is further operated to attempt downshifting after the generated count has reached the generated value of "1" and rear derailleur 36 has been downshifted to position 1, the counting component 78 will not further decrease the generated value of the generated count. Accordingly, the generated count will remain at "1" until upshifting occurs. Likewise, even if the shift lever 70 is further operated to attempt upshifting after the generated count has reached the generated value of "7" and rear derailleur 36 has been upshifted to position 7, the counting component 78 will not further increase the generated value of the generated count. Accordingly, the generated count will remain at "7" until downshifting occurs.

The process described above also occurs for upshifting and downshifting of the front derailleur 34 as performed by the shift lever 66 and 67 which control upshifting and downshifting, respectively, of the front derailleur 34 as discussed above. However, in this example, the range of the generated count is limited to the number of chain rings F1 and F2. Hence, even if the shift lever 67 is further operated to attempt downshifting after the generated count has reached the generated value of "1" and front derailleur 34 has been downshifted to position 1, the counting component 94 (FIG. 8) will not further decrease the generated value of the generated count. Accordingly, the generated count will remain at "1" until upshifting occurs. Likewise, even if the shift lever 66 is further operated to attempt upshifting after the generated count has reached the generated value of "2" and front derailleur 34 has been upshifted to position 2, the counting component 78 will not further increase the generated value of the generated count. Accordingly, the generated count will remain at "2" until downshifting occurs.

It should also be noted that the control system 12 described above can be used to control other bicycle components. For example, the control system 12 can be configured to control adjustment of a wireless electronic suspension system, wireless electronic seat post system and power adjustment system of an electronic assist bicycle. The control system 12 can also be used to control a wireless electronic brightness adjustment system of front and/or rear lamps, as well as an ON/OFF signal of a brake lamp or winker.

In addition, although not discussed in detail herein, a signal receiver of the control unit 38 can receive the count or control signals from the wireless transmitters 82 and 98. Alternatively, the control unit 38 can receive the count or control signals from the value generating units 76 and 92 via wired connections. In either configuration, the control unit 38 can display the shift positions of the front and rear derailleurs 34 and 36. The control unit 38 can be cycled or toggled in a conventional manner to display any of the following modes of operation: display time, cycling trip time, trip distance, odometer readings, a stop watch display and operation, cadence (RPMs), speed, average speed and lap counter. Optional features of the control unit 38 include displaying and/or controlling optional suspension features (not shown) added to the bicycle 10; and displaying cyclist heart rate data based on remote sensors (not shown) worn by a cyclist.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle control system comprising:
    at least one user input member;
    a value generating unit including a memory component which at least temporarily stores a generated value, with the value generating unit updating the generated value that was memorized in accordance with the at least one user input member being operated;
    a wireless transmitter that periodically transmits control signals that are indicative of the generated value even if the generated value has not changed; and
    a wireless receiver that receives the control signals from the wireless transmitter.

2. The bicycle control system according to claim 1, wherein
    the wireless transmitter is configured to periodically transmit the control signal at least every 100 msec to the wireless receiver.

3. The bicycle control system according to claim 1, wherein
    the wireless receiver is electrically connected to a bicycle component that changes between at least two different operating states in response to the control signal received by the wireless receiver.

4. The bicycle control system according to claim 3, wherein
    the bicycle component is a gear speed changing device.

5. The bicycle control system according to claim 1, wherein
    the value generating unit generates a count value that is selectively increased in response to a first user operation of the at least one user input member, and that is selectively decreased in response to a second user operation of the at least one user input member that is different from the first user operation.

6. The bicycle control system according to claim 1, wherein
    the at least one user input member includes a first user input member and a second user input member, with the first user input member increasing the generated value in response to operation of the first user input member, and the second user input member decreasing the generated value in response to operation of the second user input member.

7. The bicycle control system according to claim 6, wherein
    the wireless receiver is electrically connected to a bicycle component that changes between at least two different operating states in response to the control signal received by the wireless receiver.

8. The bicycle control system according to claim 7, wherein
    the bicycle component is a gear speed changing device, with the gear speed changing device and the value generating unit being synchronized such that the generated value corresponds to a current gear position.

9. The bicycle control system according to claim 1, wherein
    the value generating unit refrains from counting any user operation while the value generating unit is in an off state.

10. A bicycle control system comprising:
    at least one user input member;
    a value generating unit including a memory component which at least temporarily stores a generated value, with the value generating unit updating the generated value that was memorized in accordance with the at least one user input member being operated;

a wireless transmitter that periodically transmits control signals that are indicative of the generated value; and a wireless receiver that receives the control signals from the wireless transmitter, the memory component retaining the value that was last generated by the value generating unit while the value generating unit is in an off state.

11. The bicycle control system according to claim 1, wherein the value generating unit limits the value to a maximum number that corresponds to a prescribed number of gear positions.

* * * * *